United States Patent [19]

Bratsos

[11] 4,082,473

[45] Apr. 4, 1978

[54] MANUALLY OPERATED HAND DRILL

[76] Inventor: Theodore Bratsos, P.O. Box 638, Boston, Mass. 02102

[21] Appl. No.: 689,121

[22] Filed: Jun. 16, 1976

Related U.S. Application Data

[63] Continuation-in-part of Ser. No. 587,645, Jun. 17, 1975, abandoned.

[51] Int. Cl.[2] .............................................. B23B 45/06

[52] U.S. Cl. .................................... 408/101; 408/102; 408/137; 408/140

[58] Field of Search ................. 408/102, 139, 140, 87, 408/132, 137, 101, 138

[56] References Cited

U.S. PATENT DOCUMENTS

| | | | |
|---|---|---|---|
| 566,923 | 9/1896 | Mewer | 408/138 |
| 577,662 | 2/1897 | Mewer | 408/102 X |
| 691,486 | 1/1902 | Potter | 408/101 |
| 1,987,957 | 1/1935 | Kerns et al. | 408/102 |
| 3,214,773 | 11/1965 | Benjamin et al. | 408/140 |

*Primary Examiner*—Z. R. Bilinsky

[57] ABSTRACT

Manually operable tool means includes a frame formed at one side with an apertured work piece holder, and at an opposite side with an internally threaded shaft housing in which is adjustably mounted tool supporting means and a tool element. The tool element in the form of a drill, for example, while engaged with a work piece supported in the holder is turned by means of a spring loaded handle. The tool supporting means consists in a tubular adapter sleeve which is in threaded engagement with the internally threaded housing, and which is provided with a pressure-transmitting collar against which the handle engages. The tool shaft is rotatably mounted in the adapter sleeve and has the tool element detachably secured at one end. A range of pressures may be exerted through the tool element while cutting by varying the angular position of the handle against the collar as the tool is manually turned.

4 Claims, 3 Drawing Figures

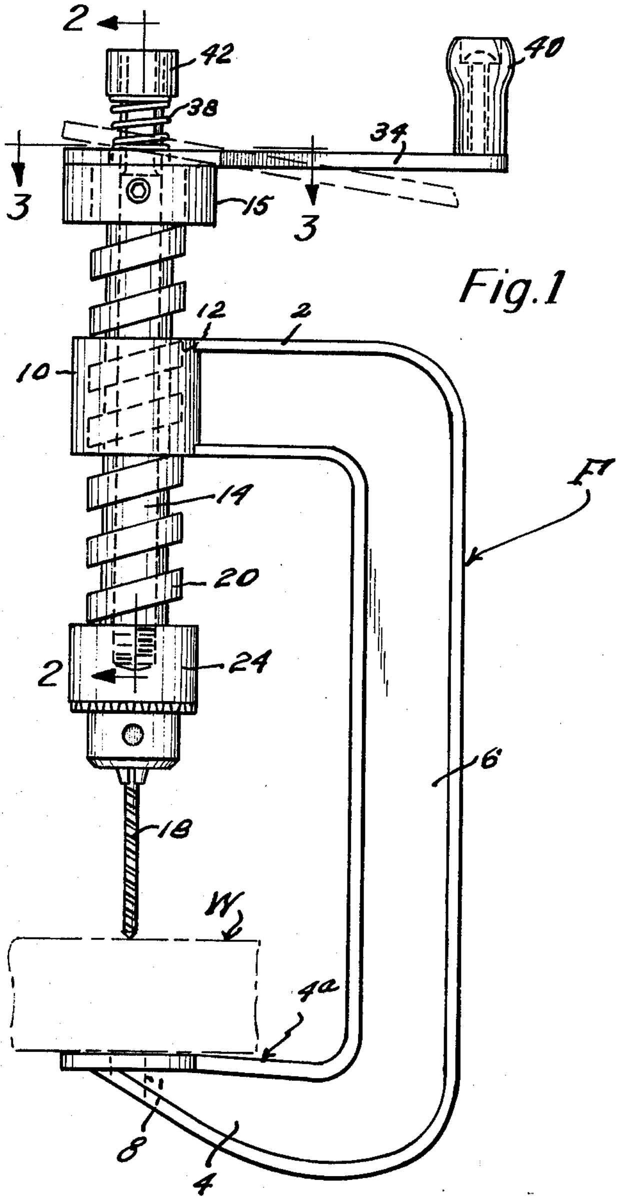
Fig.1
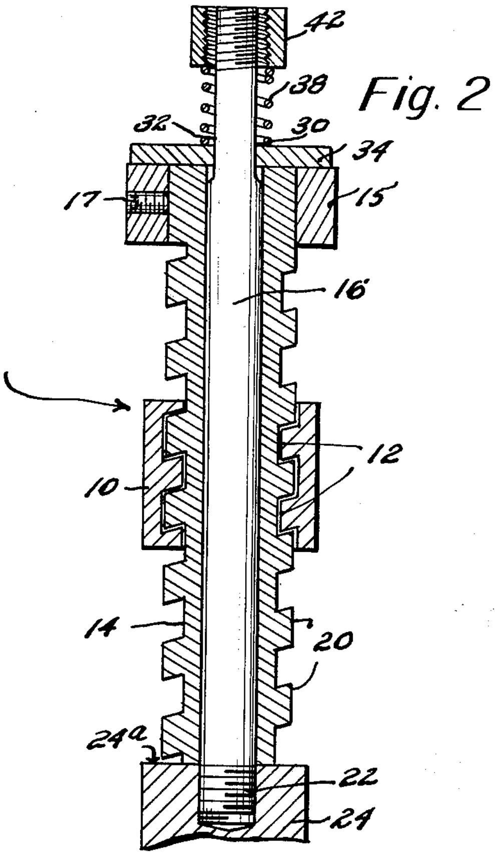
Fig. 2
Fig.3
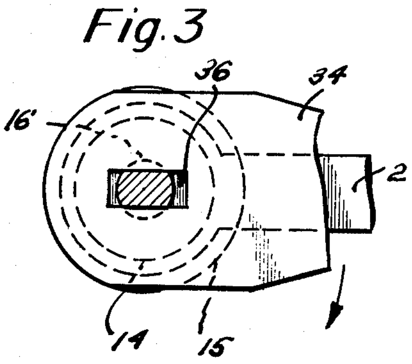

MANUALLY OPERATED HAND DRILL

BACKGROUND OF THE INVENTION

This application is a continuation-in-part application of application Ser. No. 587,645 filed June 17, 1975 now abandoned.

In the field of manually operated tools such as drills, auger bits, reamers, and the like, it is well known to support a tool element in a tool supporting frame designed for rotary cutting action. Hand operated breast drills, power drills, and the like, are typical of such devices. It is also well known to provide feeding means for rotary drills wherein a frame supports a work piece, as disclosed in U.S. Pat. Nos. 577,662 and 1,987,957.

BRIEF SUMMARIZATION OF THE INVENTION

The present invention is concerned with tools of the class indicated, and more particularly, to a manually operated tool for carrying out drilling, boring, reaming, and similar cutting operations in a work piece wherein a work piece is supported in the tool itself.

It is a chief object of the invention to devise a manually operable tool which includes a frame having at one side an apertured work piece holder portion, and at an opposite side a tool assembly which can be moved towards and away from the holder portion.

It is also an object of the invention to devise a rotary cutting tool of the character noted, which includes means for exerting a range of pressures through the cutting tool while it is being turned in engagement with the work piece.

Still another object is to devise a portable drilling tool which is of simplified construction and which can be used to carry out a cutting operation quickly and conveniently.

With these objectives in mind, there has been devised a tool arrangement which includes a frame formed at one side with an apertured work piece holder and at an opposite side with an internally threaded shaft housing which is in axial alignment with the apertured work piece holder. In combination with these parts, tool supporting means are adjustably mounted in the housing together with a tool element. The tool supporting means includes a tubular adapter sleeve which is in threaded engagement with the threaded housing and a tool shaft is rotatably mounted in the adapter sleeve and supports the tool element at one end thereof. Rigidly fixed to the tubular adapter sleeve is a pressure-transmitting collar member. A slotted handle element fitted over the tool shaft extremity is resiliently maintained against the collar by a spring member, thus resiliently urging the handle against the collar and causing the sleeve and shaft to be turned together. It has been found that by tilting the handle into angularly disposed positions with respect to the longitudinal axis of the tool shaft, a range of pressures may be readily exerted through the tool element when in engagement with a work piece.

BRIEF DESCRIPTION OF THE DRAWINGS

FIG. 1 is a side elevational view illustrating the manually operable tool means of the invention.

FIG. 2 is a cross section taken on the line 2—2 of FIG. 1.

FIG. 3 is a cross section taken on the line 3—3 of FIG. 1.

DETAILED DESCRIPTION OF THE INVENTION

The principal parts of the tool means of the invention include a frame formed with spaced apart sides, an apertured work piece holder provided in one of the sides, and means located in an opposite side for supporting a tool element for rotary engagement with a work piece supported in the apertured holder.

Considering these parts in more detail, attention is directed to FIGS. 1 and 2 wherein the arrow F denotes generally a frame member having a shape which, in one desirable form, may have the configuration of a C-clamp. The frame F is preferably constructed of a metal such as steel, and includes spaced apart sides denoted by the numerals 2 and 4, which sides are connected together by a rigid central body portion 6.

The frame side 4 is formed with an inner flat surface 4*a*, through which extends a circular tool aperture 8, to thereby provide an apertured work piece holder against which a work piece W, indicated in broken lines in FIG. 1, may be supported.

In accordance with the invention, the opposite frame side 2 is constructed with a shaft housing 10 which is formed with internal threads 12, more clearly shown in FIG. 2, which housing is arranged to lie in substantially axial alignment with the tool aperture 8 in the holder side 4. The shaft housing 10 is designed to adjustably support a tool and tool shaft assembly which includes a threaded adapter sleeve movable toward and away from the aperture 8 in flat side 4. Numeral 14 denotes the adapter sleeve, and as best shown in FIG. 1, is formed with external threads 20 for threadably engaging with the threads 12 of the housing member 10. The length of the adapter sleeve is of a magnitude such that it may project outwardly from either side of the housing 10 and at the upper end thereof, as viewed in FIG. 2, is located a pressure transmitting collar 15 solidly secured by a set screw 17, as shown.

Extending through the adapter sleeve 14 is a centrally located bore in which is rotatably received a tool shaft 16. This shaft member is of a length exceeding the length of the adapter sleeve, as indicated in FIG. 2, and at one extremity nearest to the tool aperture 8, has threads 22 to detachably receive a tool chuck 24 such as the well known Jacobs Tool Chuck.

A tool element consisting, for example, in a drill bit 18, is secured in the chuck in the conventional way. It is pointed out that the chuck 24 is held in place by right-hand pressure as it turns when shaft 16 is turned, and the top face 24*a* of this chuck member exerts back pressure on an adjacent side of the adapter sleeve 14, as suggested in FIG. 2. This back pressure combines with pressure from a handle member, hereinafter described in more detail, to develop torque in the adapter sleeve.

Other means of securing the tool element 18 may also be employed. For example, shaft 16 may have its lower extremity threaded to receive an actuating collar in place of the chuck member, and this collar may have a set screw therethrough which mates with the hole in the drill in a well known manner. In such an arrangement, the actuating collar engages with the adapter sleeve and exerts back pressure in the same manner as is accomplished by the chuck 24.

An opposite end portion of the tool shaft 16, projecting out of the adapter sleeve, is formed at opposite sides thereof with flat surfaces 30 and 32, more clearly shown in FIG. 2. Over these surfaces is slidably disposed one end of a handle 34 formed with an elongated slot 36 as illustrated in FIG. 3. Located around the end of tool shaft 10 is a coil spring member 38 held against the handle in a normally compressed position by means of retainer nut 42 threaded around the shaft extremity, as indicated in FIG. 2. The compression force of the spring is chosen such that it may operate to hold the handle 34 in a position substantially at right angles to the shaft, as indicated in FIG. 1. Compression of this spring operates to force the handle firmly against the pressure transmitting collar 15 with sufficient force to turn the adapter sleeve with the shaft 16 when handle 34 is turned by manually gripping the knob 40. As illustrative of a coil spring of suitable compression force, there may be cited a spring developing a range of pressures of from 8 to 10 pounds.

An important feature of the invention is the combination of the elongated slot 36 in the handle end with the flat sides 30 and 32 of the tool shaft. It will be observed that the slot 36 is elongated sufficiently to provide for loosely engaging the handle against the pressure transmitting collar, and as a result, the handle 34 can by tilted or moved into varying positions of angular relationship with respect to the tool shaft axis. When this is carried out, one side of the slotted end seeks to compress the spring 38 and the spring reacts to force the other side of the handle against the pressure transmitting collar with increasing intensity. It will be readily seen that by varying the angularity of the handle while it is being turned, greater or lesser force may be transmitted through the tool adapter sleeve and tool shaft to force the tool 18 against a work piece with a desirable and necessary pressure. In a typical working operation, it has been found that by means of the spring loaded handle, a range of pressures of from zero to seventy-five pounds, and higher, may be exerted on the drill, and this pressure may be developed instantly when required.

It should be observed that the tool shaft 16, being rotatably mounted in the adapter sleeve, can, in some instances, move down with the chuck 24, and drill 18 move faster than the adapter sleeve 14. When this occurs, it requires only a very short interval for the adapter sleeve to catch up with the drill bit so that a desirable flexibility is realized.

It will be understood that the frame F is required to be made strong and rigid to withstand a range of pressures which may, for example, occur in a range of from 75 pounds up to 100 pounds. It should also be understood that the sizes of the shaft housing and the adapter sleeve should be properly related to one another. For example, the root diameter of the internal thread of the shaft housing and the external thread of the adapter sleeve should fit closely enough to insure that the drill bit 18 is positioned perpendicularly to the work piece it engages. In practice, the root diameter of the shaft housing thread may be cut a fraction of an inch wider than the external thread of the adapter sleeve to provide flexibility of engagement. In one desirable thread arrangement, the adapter sleeve may be approximately 4 inches long and have a $\frac{5}{8}$ inch inner diameter and a $\frac{7}{8}$ inch outer diameter. An external right-hand square thread extends from the shaft adapter collar 15 to the bottom of the sleeve 14, as shown in FIG. 2. These threads may have $\frac{1}{4}$ inch wide crests and roots $\frac{1}{8}$ inch deep, and may occur with a lead of two turns per inch to provide approximately 8 pitch square threads needed for a suitably snug fit to prevent wobble of the shaft adapter. This also permits cutting the external threads of the adapter sleeve a fraction of an inch narrower than the internal threads of the shaft housing 10.

It is pointed out that a thread of a size, for example, of $\frac{1}{8}$ turn per inch would be ideal for a jeweler's drill, but would be useless for a general purpose drill. The thread specified, two turns per inch, with the same pitch of 8 pitch square thread, is effective for a general purpose drill to exert the range of pressures earlier disclosed. This thread lead also permits the handle 34 to exert cutting pressure with a $\frac{1}{4}$ turn of the handle or less.

It will be apparent that there has been disclosed a convenient tool apparatus which may be readily carried in the pocket of a workman or which may be supported in any desired position in a vice or other clamping apparatus. A most common usage would be drilling a plate of steel or other material with the frame held in an upright position. However, the frame may also be used in a horizontal position by supporting a work piece against the holder and engaging the drill bit against it with sufficient pressure to hold it in place. It may also be desired to provide means for mechanically holding the work piece against the holder to avoid rotative movement of the work piece when cutting takes place.

I claim:

1. Manually operable tool means comprising a frame formed with a work piece holder and a shaft housing located in spaced relation to the work piece holder, said shaft housing having an internally threaded bore, a tool supporting adapter sleeve having an external thread engageable with the threaded bore of the tool housing, and said external thread of the adapter sleeve being axially displaceable in the internally threaded bore of the shaft housing, a pressure transmitting collar secured at the upper end of the adapter shaft, a tool shaft rotatably mounted in the adapter sleeve, chuck means secured at one end of the tool shaft against which the bottom of the adapter sleeve is received, the opposite end of said shaft having flat side portions, a tool element detachably supported in the chuck means, a slotted tilting handle member slideably engaged with an opposite upper end of the said tool shaft around said flat side portions thereof for rotating the shaft and tool element, coiled spring means located around said upper end of the shaft resiliently urging the slotted tilting handle against the pressure transmitting collar, said tilting handle being angularly displaceable to form on acute angle with respect to the axis of rotation of the tool shaft to variably compress the coiled spring means and transmit a range of cutting pressures against the transmitting collar and adapter sleeve while the handle is being rotated.

2. Manually operable tool means comprising a frame formed with a work piece holder and a shaft housing located in spaced relation to the work piece holder, said shaft housing having an internally threaded bore, a tool supporting adapter sleeve having an external thread engageable with the threaded bore of the tool housing to move the sleeve toward and away from the work piece holder, a pressure transmitting collar secured at the upper end of the adapter sleeve, a tool shaft rotatably mounted through the adapter sleeve chuck means secured at one end of the tool shaft against the bottom of the adapter sleeve, a tool element detachably secured in the chuck member in alignment with the work piece holder, tilting handle means and means for slidably securing said handle means with respect to said tool shaft at an opposite end of said tool shaft for turning said tool shaft and tool element about their longitudinal axes, while in varying positions of tilting forming on acute angle with respect to the said axes, said internally threaded bore of the housing being formed with an internal thread which is of square cross section and presents flat crests, and said external thread being formed with a square cross section and flat crests which mate with the internal thread, the root diameter of the internal thread being of a dimension greater than the crest diameter of the external thread and said internal thread having helical portions spaced apart a distance greater than the width of corresponding helical portions of the external thread to provide for axial displacement of the adapter sleeve in the shaft housing, and spring means mounted on said shaft and engaging said handle thus urging said handle against the adapter sleeve during rotatable movement of the handle to vary the axial displacement of the external thread in the internally threaded bore of the shaft housing and turn the adapter sleeve through a range of cutting pressures which ae controlled in accordance with the pressures exerted through the handle by its tilting.

3. The invention of claim 2 in which the tool shaft at its upper end is formed with flat sides and the said handle means being formed with an elongated slot engageable with the flat sides, said spring means consisting in a coiled spring mounted between the slotted end of the handle and the top of the shaft, for normally holding the handle in a position at right angles to the axis of the shaft, and said coiled spring being compressible at one side when the handle is tilted and being extensible at an opposite side against the handle with increasing pressure.

4. The invention of claim 2 in which the internal threads of the shaft housing and the external threads of the adapter sleeve are of a construction providing for two or less turns per inch.

* * * * *